United States Patent [19]

Grenier

[11] Patent Number: 5,496,073
[45] Date of Patent: Mar. 5, 1996

[54] DISENGAGEMENT TOOL FOR USE WITH A PIPE JOINT ASSEMBLY

[75] Inventor: Wilfred J. Grenier, Rutland, Mass.

[73] Assignee: Rovac Corporation, Rochdale, Mass.

[21] Appl. No.: 158,347

[22] Filed: Nov. 29, 1993

[51] Int. Cl.$^6$ ............................ F16L 37/088; F16L 35/00
[52] U.S. Cl. ................................... 285/39; 285/322
[58] Field of Search .................. 285/39, 105, 318, 285/322, 323, 321

[56] References Cited

U.S. PATENT DOCUMENTS

| | | | |
|---|---|---|---|
| 2,346,051 | 4/1944 | Seamark | 285/318 |
| 3,724,880 | 4/1973 | Seiler | 285/105 |
| 3,815,940 | 6/1974 | Luckenbill | 285/323 |
| 4,586,734 | 5/1986 | Grenier | 285/340 |
| 4,902,043 | 2/1990 | Fillig et al. | 285/39 |
| 4,927,185 | 5/1990 | McNaughton | 285/39 |
| 5,219,188 | 6/1993 | Abe et al. | 285/39 |
| 5,328,215 | 7/1994 | Grenier | 285/105 |

FOREIGN PATENT DOCUMENTS

| | | | |
|---|---|---|---|
| 537711A1 | 4/1993 | European Pat. Off. | 285/322 |
| 1247889 | 10/1989 | Japan | 285/322 |
| 1247886 | 10/1989 | Japan | 285/322 |
| 251693 | 2/1990 | Japan | 285/322 |
| 251694 | 2/1990 | Japan | 285/322 |
| 5312286 | 5/1992 | Japan | 285/322 |
| 4203688 | 7/1992 | Japan | 285/322 |
| 5312286 | 11/1993 | Japan | 285/322 |
| 2166508 | 5/1986 | United Kingdom | 285/39 |

*Primary Examiner*—Eric K. Nicholson
*Attorney, Agent, or Firm*—John E. Toupal; Harold G. Jarcho

[57] ABSTRACT

A disengagement tool for a coupling assembly including a receiving tubular member for receiving a first tubular member, the receiving tubular member having an inner portion defining an inner bore dimensioned to receive one end of the first member and an outer portion defining an internal annular cavity intersecting the inner bore and projecting radially therefrom and a split lock ring disposed in the annular cavity and adapted to expand circumferentially therein during insertion of the first tubular member into the receiving tubular member. Forming the tool are parts with actuator end portions for engaging circumferential edge portions of the split ring and a driver portion for engaging an end thereof to facilitate axial rotation thereof on the first tubular member.

9 Claims, 6 Drawing Sheets

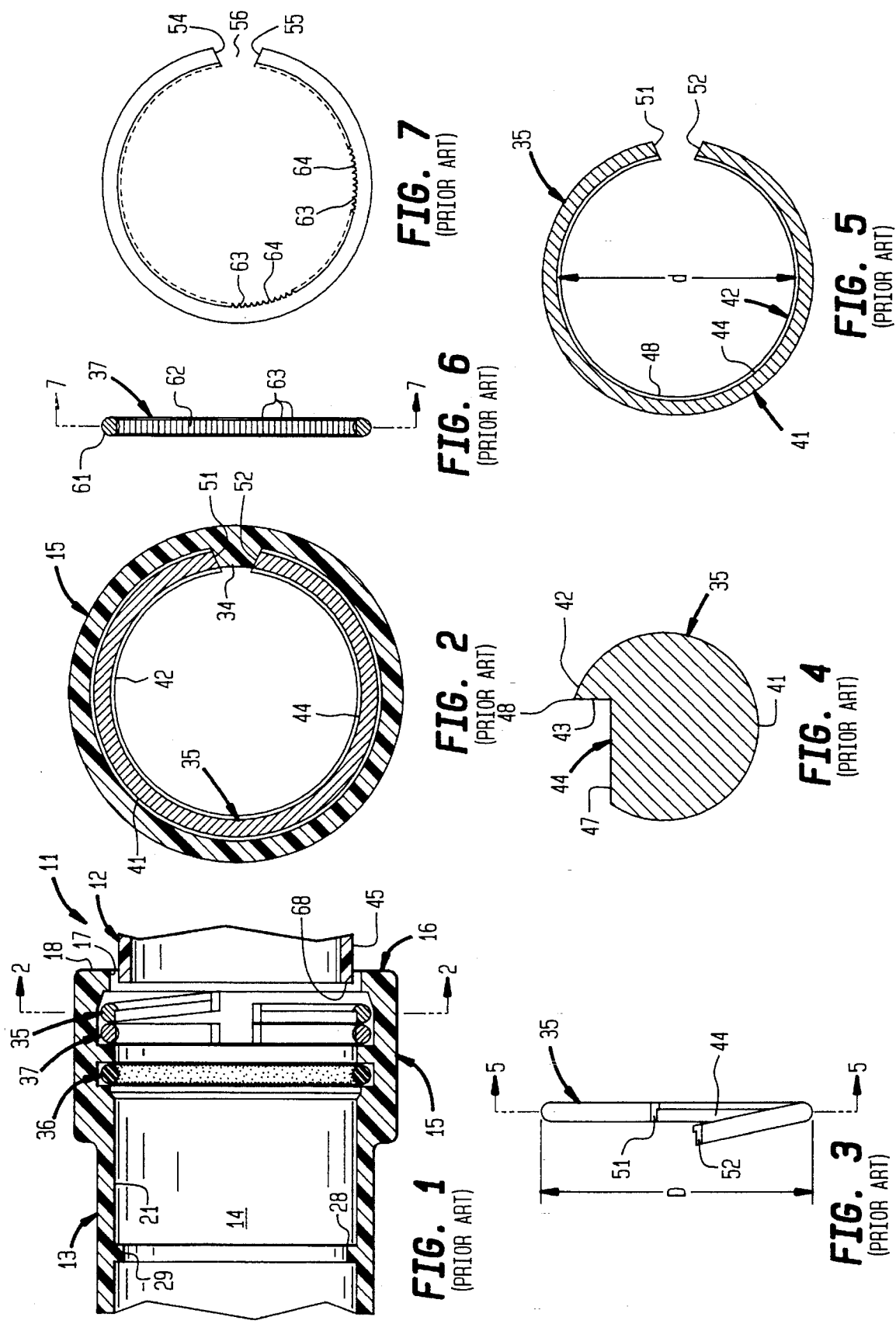

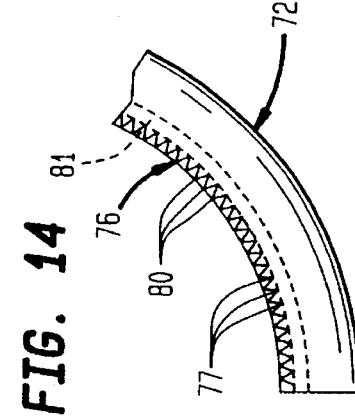
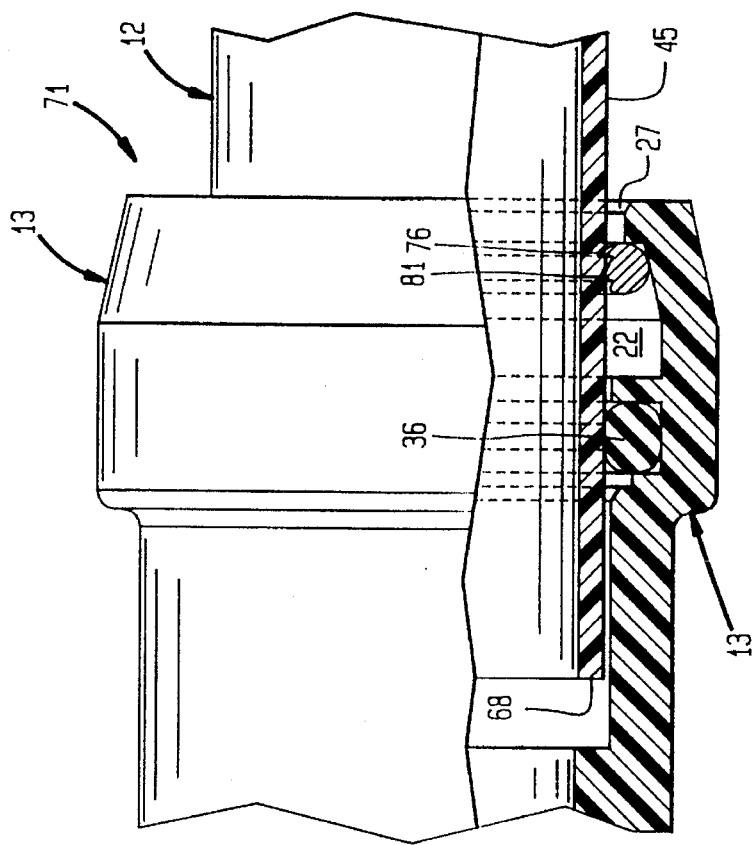
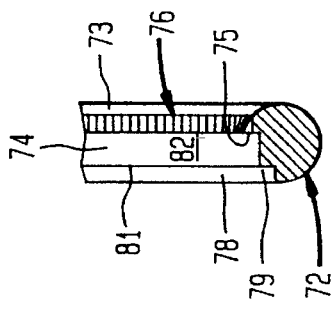
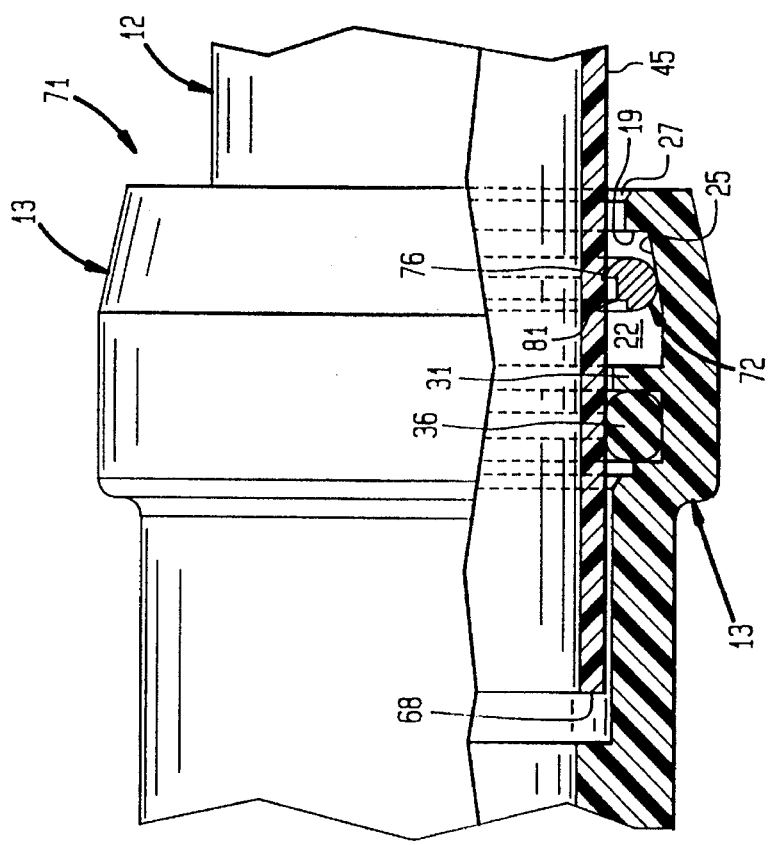
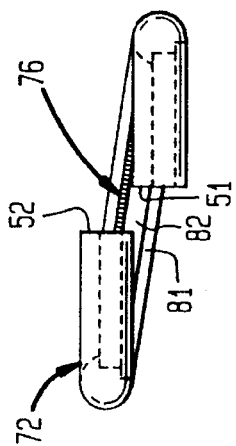

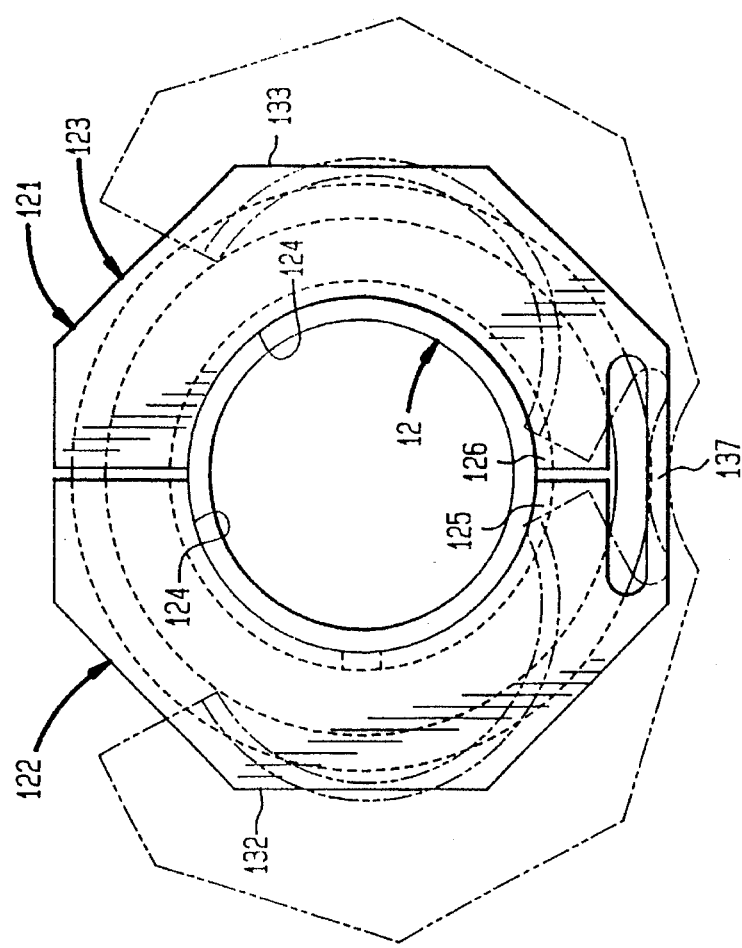
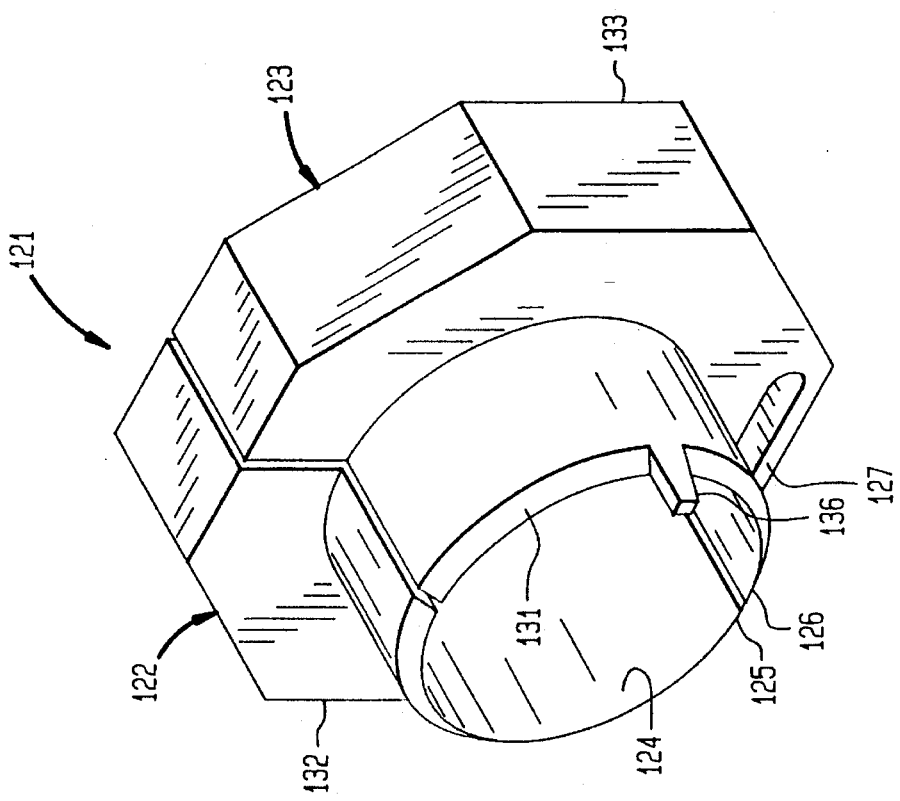

5,496,073

DISENGAGEMENT TOOL FOR USE WITH A PIPE JOINT ASSEMBLY

BACKGROUND OF THE INVENTION

The invention relates generally to an improved pipe coupling assembly and, more particularly, to an easily assembled and disassembled pipe coupling assembly.

Known methods for connecting a length of metal pipe or tubing to valves or pipe fittings such as elbows and tees include the use of threaded connectors, soldering, compression fitting, flaring and welding. Non-metallic pipe, such as thermoplastic pipe, may also be joined by adhesives.

These methods are all subject to various drawbacks. Methods calling for the application of heat or force can be awkward and time consuming to practice in cramped and inaccessible areas, for example, areas in which residential plumbing is typically located. Soldering, welding and the like require the attention of a skilled worker using special tools to produce a good connection. Moreover, it is often difficult and time consuming to disconnect a length of pipe from a fitting once they have been joined, and it is often not possible to disassemble the joint without damaging the pipe or the fitting to such an extent that they cannot later be rejoined.

Acceptable pipe joints are more difficult to make when the pipe is to carry a fluid under pressure. Even where threaded pipe and threaded connectors are used, greater skill is required to produce a strong and leakproof seal which will withstand the pressure rating of the pipe being joined. For proper sealing under pressure, washers or O-rings are often included in the joint. If the washer and pipe are made of dissimilar metals, they will sometimes undergo electrolysis in the presence of moisture in the joint or water and chemical agents flowing through the pipe. Electrolytic action leads to degradation of the washer, which can eventually cause the joint to leak and loosen the locking action of lock washers.

Some of the aforementioned drawbacks are overcome by the use of plastic pipe joined by adhesive. But plastic pipe is difficult to connect directly to metal valve fittings without special adaptors. Moreover, once sealed with adhesive, prior plastic pipe joints cannot be readily undone. Disclosed in U.S. patent application Ser. No. 07/944,373, now U.S. Pat. No. 5,328,215, is an improved coupling assembly that is illustrated in FIGS. 1–9. A pipe coupling assembly 11 includes an inner first tubular member 12 and an outer receiving tubular member 13. The tubular member 12 generally will be a length of pipe or tubing such as commonly employed for the delivery of fluids. The embracing tubular member 13 will generally form a part of a pipe fitting, such as an elbow, tee, or the like, or will form a part of some other component of a piping system, such as a valve.

The receiving tubular member 13 includes an inner portion 14, an outer portion 15 and an end portion 16 with a radially inwardly directed rim 18 that defines a circular opening 17 and an inwardly directed shoulder 19. Defined by the inner portion 14 of the receiving tubular member 13 is an inner bore 21 dimensioned to snugly receive the outer surface of the first tubular member 12. The outer portion 15 of the receiving tubular member 13 defines an annular cavity 22 intercepting the inner bore 21 and projecting radially outwardly therefrom. Forming the annular cavity 22 is a cylindrical wall portion 24 and an annular tapered wall portion 25 joining the cylindrical wall portion 24 and the shoulder 19 surrounding the opening 17. An annular gap 27 is formed between the first tubular member 12 and the rim 17 which has a diameter larger than the outer surface thereof. Defining an annular shoulder 28 on the receiving tubular member 13 is a counterbore 29. An annular rib 31 on the receiving tubular member 13 projects inwardly from the cylindrical portion 24 and separates the cavity 22 into longitudinally separated cavity portions 32 and 33. Projecting inwardly from the cylindrical wall portion 24 in the cavity portion 32 is a longitudinally disposed ridge 34.

The pipe coupling assembly 11 also includes a split lock ring 35 disposed in the cavity portion 32, a sealing member 36 such as a resilient O-ring disposed in the cavity portion 33, and a split auxiliary ring 37 disposed in the cavity portion between the lock ring 35 and the annular rib 31.

The lock ring 35 is made from a material suitable to establish a good spring characteristic. As shown in FIGS. 3–5, the lock ring 35 has a circular cross-section, an outer circumferential surface portion 41 of diameter D less than the diameter of the adjacent cylindrical wall portion 24, and an inner circumferential surface portion 42 of diameter d less than the outer diameter of the first tubular member 12. Cut in the inner surface portion 42 is a circumferential groove 44 formed by one wall 43 oriented perpendicular to an outer surface 45 of the first tubular member 12, and another wall 47 extending between the outer surface of the ring 35 and the one wall 43 and oriented perpendicular thereto. The another wall 47 extends from the one wall 44 toward the opening 17 in the tubular member 13. Formed by the periphery of the one wall 43 is a circumferential knife edge 48 extending parallel to the outer surface 45 of the first tubular member 12. First and second ends 51, 52 of the lock ring 35 straddle a split therein and, as shown in FIG. 3, the second end 52 is axially displaced from the first end 51 which is circumferentially aligned with the major portion of the ring 35.

During assembly of the coupling 11, the first tubular member 12 is inserted through the opening 17 in the receiving tubular member 13 until an inner end 68 of the member 12 engages the annular shoulder 28 as shown in FIG. 4. As the first tubular member 12 moves through the annular cavity 22, its external surface engages the knife edge inner surface 48 of the lock ring 35 expanding it outwardly into the cavity portion 32 of the annular cavity 22. However, since the outer diameter D of the lock ring 35 is less than that of the cylindrical wall portion 24, inward axial movement of the first tubular member 12 is not restricted. In addition, the auxiliary ring 37 is compressed between the cylindrical surface portion 24 and the outer surface of the first tubular member 12 which outer surface is scored by the longitudinal projecting edges 64. Because of this penetration of the first tubular member 12 by the edges 64 on the compressed auxiliary ring 37, rotation of the first member 12 within the receiving member 13 is prevented. A tapered annular transitional surface 69 between the cylindrical surface portion 24 and the inner bore 21 accommodates longitudinal migration of the sealing member 36 so as to prevent damage thereto during insertion of the first tubular member 12 as shown in FIG. 8.

After full insertion, the first tubular member 12 is partially withdrawn to produce a longitudinal separation movement relative to the receiving tubular member 13. During that movement, the lock ring 35 is forced longitudinally outwardly in the annular cavity 22 and tightly compressed therein between the shoulder stop 19, the tapered wall portion 25 and the outer surface of the first tubular member 12 as shown in FIG. 9. Because of the penetration of the outer surface of the first tubular member 12 by the knife edge 48 on the lock ring 35, further relative longitudinal movement between the member 12 and the receiving tubular member 13 is prevented. In addition, the second end 52 of the lock ring 35 is forced into circumferential alignment with the first end 51 creating an axially directed force that biases the member 12 inwardly in the member 13. Fluid pressure within the coupling 11 exerts on the first member 12 a longitudinally outwardly directed force F that is transferred by the tapered wall portion 25 radially inwardly on the lock ring 35. Consequently, the knife edge 48 is driven further into the outer surface of the first member 12 and enhancing the securement thereof to the receiving member 13. With the parts in the relative positions shown in FIG. 9, the O-ring 36 is engaged between the cylindrical surface portion 24 and the outer surface of the first tubular member 12 to create a fluid tight seal therebetween. The annular rib 31 prevents damage of the annular sealing member 36 by the teeth 63 on the auxiliary ring 37.

The coupling assembly 11 alleviates many of the above noted problems. However, the operational characteristics of the coupling 11 are not suitable for all applications.

The object of this invention, therefore, is to provide an improved high pressure pipe coupling assembly that can be easily assembled and disassembled by unskilled workers.

SUMMARY OF THE INVENTION

The invention is a coupling assembly including a receiving tubular member defining an opening for receiving a first tubular member, the receiving tubular member having an inner portion defining an inner bore dimensioned to receive one end of the first member and an outer portion defining an internal annular cavity intersecting the inner bore and projecting radially outwardly therefrom, the annular cavity comprising an annular tapered wall portion tapered radially inwardly and projecting longitudinally toward the opening; and a split lock ring formed from spring material and disposed in the annular cavity between the first tubular member and the receiving tubular member, the lock ring having an outer circumferential surface portion adapted to engage the tapered wall portion and an inner circumferential surface portion adapted to engage an external wall portion of the first tubular member, the lock ring being adapted to expand circumferentially into the annular cavity during insertion of said first tubular member into the receiving tubular member and to be compressed between the tapered wall portion and the external wall portion in response to relative longitudinal separating movement between the first tubular member and the receiving tubular member and, the inner circumferential surface portion defining first and second substantially parallel, spaced apart, circumferentially extending knife edge means. Also included is an annular sealing member disposed in the annular cavity between said lock ring and the inner bore, the sealing member dimensioned to be engaged between said first tubular member and the receiving tubular member. Under high pressure conditions both knife edge means penetrate the external wall portion so as to prevent longitudinal movement of the first tubular member relative to the receiving tubular member.

According to one feature of the invention, each knife edge means is a circumferential edge formed by, respectively, first and second circumferential grooves in the lock ring. The circumferential knife edges penetrate the first tubular member to prevent relative movement thereof.

According to other features of the invention the first groove defines one wall terminated by the first circumferential edge and oriented substantially perpendicular to the external wall portion and the second groove defines a second wall terminated by the second circumferential edge and oriented substantially perpendicular to the external wall portion. The substantially perpendicular wall portions form effective movement restricting knife edges.

According to yet another feature of the invention, the lock ring has first and second ends normally axially displaced, and the first and second ends are forced into substantial alignment in response to compression of the lock ring between the tapered wall portion and the external wall portion. With its ends aligned, the lock ring creates a force biasing the first tubular member into the receiving tubular member.

According to yet another feature of the invention, the split ring has an inner diameter less than the outer diameter of the first tubular member. This feature assures penetration of the first tubular member by the knife edges.

According to a further feature of the invention, at least one of the knife edge means defines a plurality of circumferentially spaced apart slots that form circumferentially distributed teeth on the knife edge means. The teeth engage the first tubular member to prevent therebetween relative rotational movement that would excessively score the outer surface.

The invention also encompasses a coupling including an externally threaded receiving tubular member defining an opening adapted to receive a first tubular member; the receiving tubular member having an inner portion defining an inner bore dimensioned to receive one end of the first tubular member; and an outer portion defining an internal annular cavity intersecting the inner bore and projecting radially outwardly therefrom, the annular cavity comprising an annular tapered wall portion tapered radially inwardly and projecting longitudinally toward the opening; a split lock ring defining at least one circumferentially extending knife edge means for penetrating the external wall portion so as to prevent longitudinal movement of the first tubular member relative to the receiving tubular member; an annular sealing member disposed in the annular cavity between the lock ring and the inner bore; and an outer tubular coupling member having an internally threaded portion for engaging the receiving member and an annular reentrant portion received by the annular cavity and defining the outwardly tapered wall portion for engaging the lock ring.

According to one feature of the immediately above invention, the inner bore terminates with an annular groove facing the opening, partially formed by the inner bore, and dimensioned to receive the one end, the receiving member is plastic, and the first tubular member comprises radially spaced apart plastic laminations separated by a metal lamination. The plastic laminations become swedged into the groove to form a seal around the metal lamination.

The invention further encompasses a disengagement tool for use with the above assemblies and including a plurality of arcuately shaped parts, each having an inner surface conforming to the outer surface of the first tubular member and adapted for engagement therewith in a juxtaposed relationship thereabout to the parts being adapted for sliding movement on the first tubular member and having actuator end portions adapted to be pushed through the opening into the annular cavity and into forcible engagement with the lock ring so as to cause circumferential expansion thereof. In addition, at least one of the parts has a driver portion for engaging the first end of the lock ring and causes rotation thereof in response to rotation of the one part on the outer surface of the first tubular member. Rotation of the lock ring releases it from annular burrs formed in the first tubular member by the penetrating knife edges and subsequent circumferential expansion of the lock ring eliminates engagement between the knife edges and the first tubular member to permit removal thereof.

DESCRIPTION OF THE DRAWINGS

These and other objects and features of the invention will become more apparent upon a perusal of the following description taken in conjunction with the accompanying drawings wherein:

FIGS. 1–9 illustrate a prior art coupling assembly;

FIG. 10 is a partial longitudinal cross sectional view of a coupling assembly according to the invention;

FIG. 11 is a top view of a lock ring utilized in the assembly of FIG. 1;

FIG. 12 is a partial cross sectional view taken along lines 12—12 in FIG. 11;

FIG. 13 is a partial side view of the lock ring utilized in the assembly of FIG. 1;

FIG. 14 is a cross sectional view of the assembly shown in FIG. 1 under different operating conditions;

FIG. 17 is a perspective view of a disengagement tool for use in disassembling the pipe coupling shown in FIG. 1;

FIG. 18 is an end view of the tool shown in FIG. 17;

DESCRIPTION OF THE PREFERRED EMBODIMENTS

Figure 9:
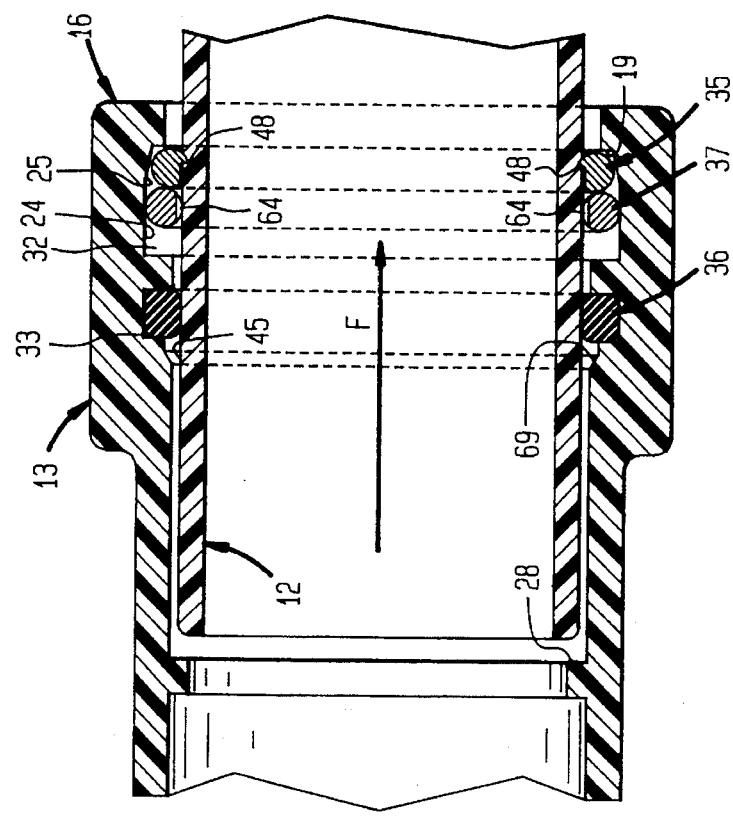
Figure 8:
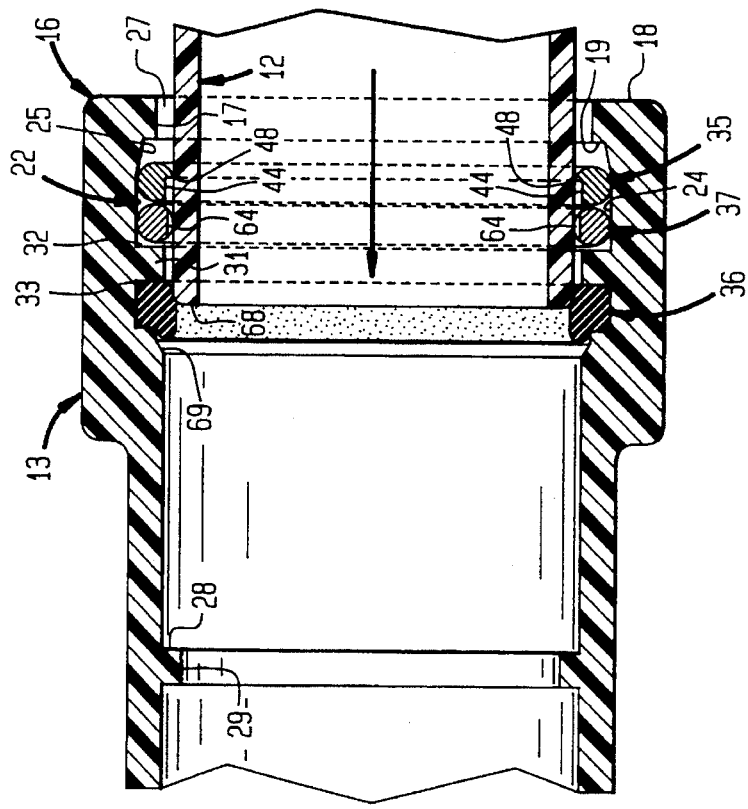

A coupling assembly 71 shown in FIGS. 10–14 is similar to the prior coupling assembly 11 shown in FIGS. 1–9 and identical parts of the two assemblies have been given the same reference numerals. Eliminated from the coupling assembly 71 is the auxiliary ring 37 used in the prior coupling assembly 11 and the split lock ring 35 therein is replaced in the assembly 71 by a split lock ring 72. Again, the lock ring 72 is made from a material suitable to establish a good spring characteristic.

The lock ring 72 has a circular cross section and circumferential dimensions identical to those described above for the lock ring 35 of coupling assembly 11. Cut into an inner surface portion 73 of the ring 72 is a first circumferential groove 74 formed by a first wall 75 oriented perpendicular to the outer surface 45 of the first tubular member 12. The periphery of the first wall 75 forms a first circumferential knife edge 76 extending parallel to the outer surface 45 of the first tubular member 12. As shown in FIGS. 11–13, a plurality of circumferentially distributed slots 77 are cut into the inwardly directed circumferentially formed knife edge 76 on the split ring 72. The slots 77 form circumferentially distributed teeth 80 on the knife edge 76.

Also cut into the ring 72 adjacent to the first groove 74 is a second circumferential groove 78 including a second wall 79 extending perpendicular to the outer surface 45 of the first tubular member 12 and terminating with a second circumferential knife edge 81 spaced from and parallel to the first knife edge 76. The second wall 79 intersects a third wall 82 of the first groove 74. As described for the lock ring 35, the lock ring 72 has first and second axially displaced ends 51, 52 that straddle a split as shown in FIG. 11.

The coupling assembly 71 is assembled in the same manner as described above for the coupling assembly 11. As the first tubular member 12 is partially withdrawn from the receiving tubular member 13, the lock ring 72 is forced longitudinally outwardly in the annular cavity 22 producing penetration of the outer surface 45 of the first tubular member 12 by the first knife edge 76 as shown in FIG. 10. Because of this engagement between the first knife edge 76 and the first tubular member 12 and the wedging of the lock ring 72 by the tapered wall portion 25, further relative longitudinal movement between the members 12 and 13 is prevented.

In the event of a significant increase in fluid pressure within the tubular members 12, 13, the increased force exerted between the engaged members 12 and 72 can induce clockwise twisting of the ring 72 and further wedging movement thereof along the tapered wall portion 25 of the annular cavity 22 and into engagement with the shoulder 19 as shown in FIG. 14. Such twisting of the ring 72 causes the second knife edge 81 to also penetrate that outer surface 45 of the first tubular member 12. With both the first and second longitudinally spaced apart knife edges 76, 81 engaged with the external surface 45, additional separating movement between the first tubular member 12 and the second tubular member 13 and further twisting of the ring 72 are prevented. In addition, engagement between the outer surface 45 and the teeth 80 insures that any induced rotation of the first tubular member 12 within the receiving tubular member 13 will produce sympathetic rotation of the lock ring 72. Thus, excessive scoring of the outer surface 45 by the knife edges 76, 81 is prevented.

Figure 16:
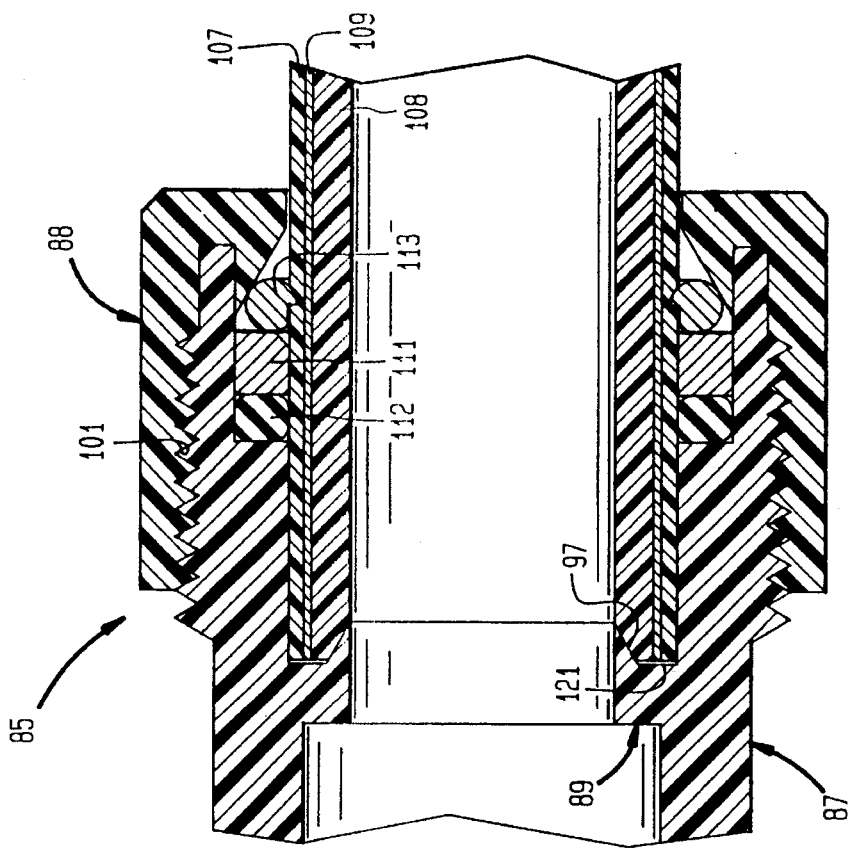
FIG. 16 is a cross sectional view of the assembly of FIG. 15 shown fully assembled.
Figure 15:
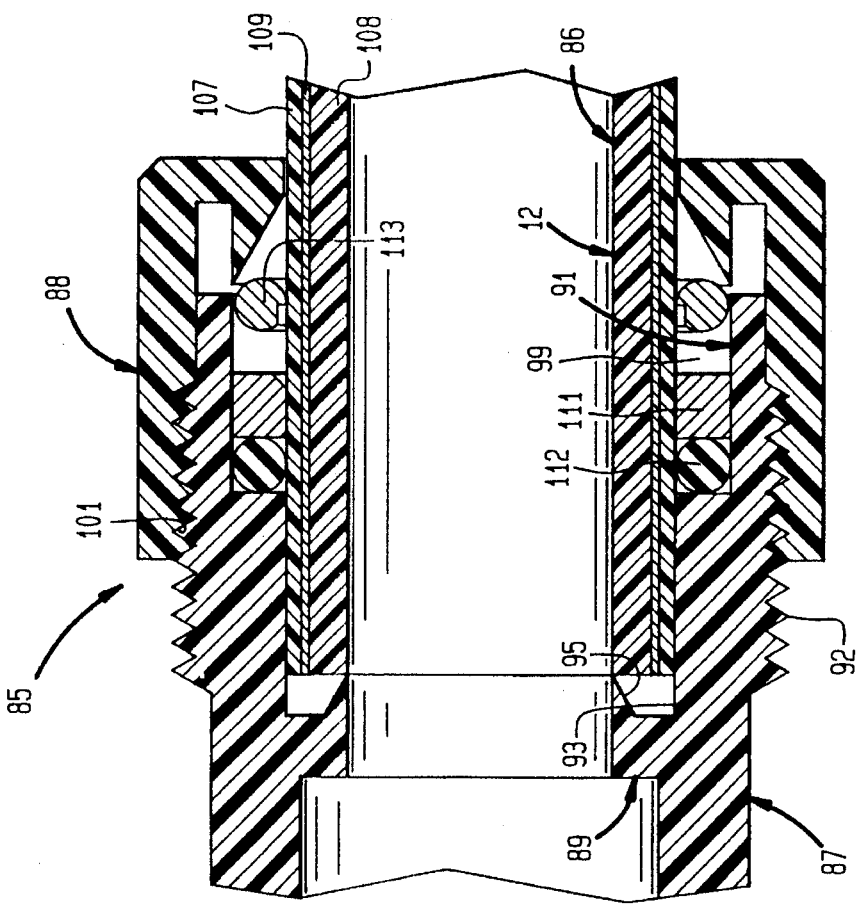
FIG. 15 is a partial longitudinal cross sectional view of another coupling assembly embodiment shown partially assembled.

Illustrated in FIGS. 15 and 16 is another coupling assembly 85 including an inner first tubular member 86, an outer receiving plastic tubular member 87 and an outer tubular coupling member 88. The receiving tubular member 87 includes an inner portion 89 and an outer portion 91 and an externally threaded outer surface 92. Defined by the inner portion 89 is an inner bore 93 dimensioned to snugly receive the outer surface of the first tubular member 86. Also defined by the inner portion 89 of the receiving tubular member 87 is an annular groove 96 partially formed by the inner bore 93 and facing an opening 96 for receiving the first tubular member 86. The annular groove 95 has a radially inwardly and longitudinally outwardly tapered surface 97. Defined by the outer portion 91 of the receiving tubular member 87 is an radially outwardly opening annular cavity 99 that intersects the inner bore 93.

The tubular coupling member 88 has an internally threaded portic 101 for engaging the externally threaded portion 92 of the receiving member 87. Formed at one end of the coupling member 88 is an annular reentrant portion 102 that is dimensioned to enter the annular cavity 99 in the receiving member 88. The reentrant portion 102 has a inwardly tapered wall portion 105 projecting radially inwardly and toward the opening 96. Preferably, the first tubular member 86 is composed of an outer plastic lamination 107, an inner plastic lamination 108, and an intermediate metal lamination 109 between the inner and outer plastic laminations 107, 108. Straddled by a plastic spacer ring 111 in the annular cavity 99 is an internal O-ring 112 and a split lock ring 113 that is substantially identical to the split lock ring 35 described above and shown in FIGS. 3 and 4. Again, the ring 113 is a split ring and dimensioned for operation in the same manner as described above for the split ring 35.

During assembly of the coupling assembly 85 the first tubular member is inserted through the opening 96 in the receiving tubular member 87 and into engagement with the tapered surface 97 of the annular groove 95 as shown in FIG. 15. Next, the coupling member 88 is rotated inwardly on the receiving member 87 to produce movement of the reentrant portion 102 into the annular cavity 99. Engagement between the tapered surface 105 and the split ring 113 causes penetration of the outer lamination 107 of the first tubular member 86 by a knife edge 115 on the split ring 113. Because of the engagement between the ring 113 and the first outer lamination 107, further inward movement of the reentrant portion 102 forces an inner end 121 of the first tubular member 86 into the annular groove 95 in the receiving member 87. That action swedges the inner end 121 of the first tubular member 86 against the tapered surface 97 and produces between the engaging plastic surfaces of the annular groove 95 and the inner lamination 108 a high force creating a fluid tight seal. That seal prevents contact between a fluid within the tubular member 86 and the metal lamination 109 to insure against corrosion thereof. In addition, the inward movement of the reentrant portion 102 forces the spacer ring 111 inwardly compressing the O-ring 112 to create a secondary seal between the O-ring 112 and the fixed outer lamination 107 in the event of the leakage through the seal between the inner lamination 108 and the annular groove 95 of the receiving tubular member 87.

Figure 19:
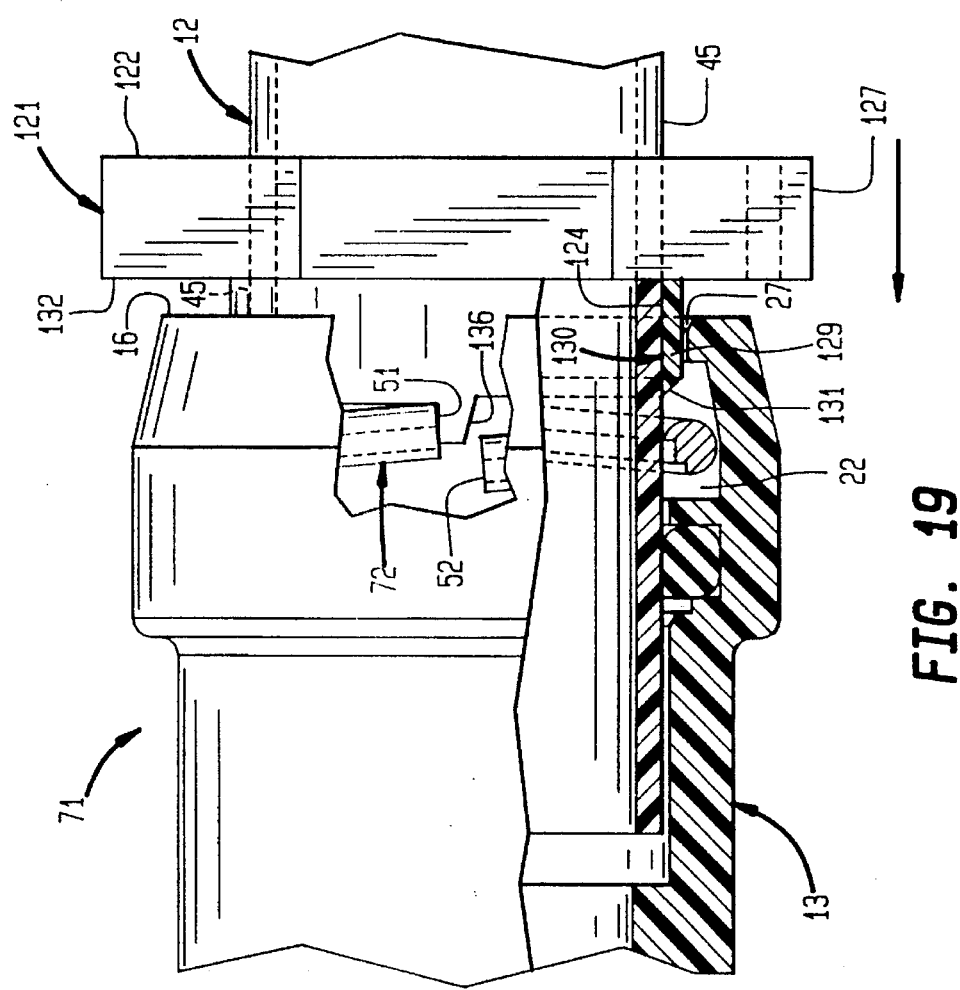
FIG. 19 is a longitudinal cross sectional view of the tool shown of FIG. 17 shown engaging a coupling assembly.

Disassembly of the coupling 71 requires the use of a disengagement tool 121 shown in FIGS. 17–19. The disengagement tool 121 consists of first and second identically shaped arcuate parts 122, 123, respectively. Each of the parts 122, 123 has a longitudinally extending inner cylindrical surface 124 conforming to the outer surface of the first tubular member 12. One end 125 of the part 72 is connected to one end 126 of the part 123 by a flexible connection portion 127 that permits relative pivotal movement therebetween as shown by dashed lines in FIG. 18. When positioned on the outer surface of a first tubular member 12 actuator end portions 129 of the parts 122, 123, form a composite tube 130 having an outwardly facing, annular tapered surface 131. Extending radially outwardly from each of the parts 122, 123 is a flange portion 132, 133, respectively. A driver portion 136 projects outwardly from the end 129 of the part 122.

Figure 20:
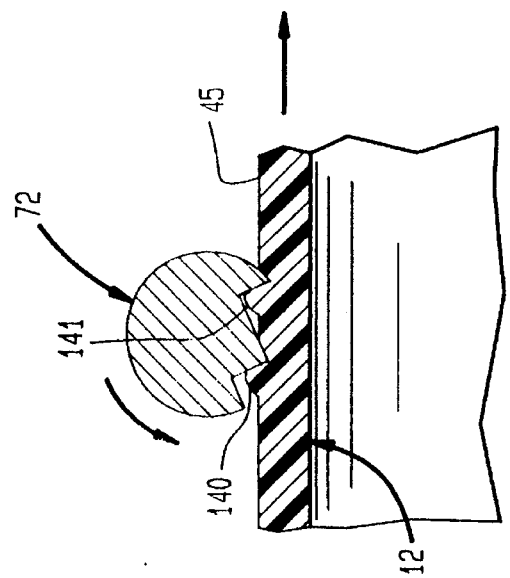
FIG. 20 is a detailed view illustrating engagement of a split lock ring and a tubular member.

To disassemble the coupling 71, the opposite ends 125, 126 of the parts 122, 123, respectively, are separated as shown in FIG. 19 allowing the tool 71 to be positioned around the tubular member 12 with the surfaces 124 engaging the outer surface 45 thereof. Next, the flange portions 132, 133 of the parts 122, 123 are pushed to produce sliding movement of the cylindrical surfaces 124 on the outer surface 45 of the first tubular member 12. That sliding movement is continued to move the annular actuator end 129 of the composite tube 130 through the annular gap 27 until the driver portion 136 engages the end 51 of the lock ring 72 as shown in FIG. 19. One revolution of the parts 122, 123 on the surface 45, rotates the lock ring 72 out of the burrs 140, 141 created by the knife edges 76, 81 and shown in FIG. 20. Next, the tool 121 is pushed inwardly until the flange portions 132, 133 engage the outer end 16 of the receiving tubular member 13. During the inward movement of the actuator end portions 129, the annular tapered surfaces 131 engage and force the lock ring 72 into an inward position as shown in FIG. 19. Movement into that inner portion of the cavity 22 allows the lock ring 72 to expand circumferentially in response to the radially outwardly directed force produced by the tapered surfaces 131. The circumferential expansion eliminates engagement between the lock ring 72 and the outer surface 45 of the first tubular member 12. Accordingly, the first tubular member 12 can be withdrawn easily from the receiving tubular member 13.

Obviously, many modifications and variations of the present invention are possible in light of the above teachings. It is to be understood, therefore, that the invention can be practiced otherwise than as specifically described.

What is claimed is:

1. A disengagement tool for use with a coupling assembly for use in connecting a first tubular member at a first end thereof to a component of a piping system and including a receiving tubular member on said component and defining an opening adapted to receive said first tubular member, said receiving tubular member having an inner portion defining an inner bore dimensioned to snugly receive said first end and an outer portion defining an internal annular cavity intersecting said inner bore and projecting radially outwardly therefrom, said annular cavity comprising an annular tapered wall portion tapered radially inwardly and projecting longitudinally toward said opening;

a split lock ring disposed in said annular cavity between said first tubular member and said receiving tubular member, said lock ring having first and second normally axially displaced ends and an outer circumferential surface portion adapted to engage said tapered wall portion and an inner circumferential surface portion adapted to engage an external wall portion of said first tubular member, said lock ring being adapted to expand circumferentially into said annular cavity during insertion of said first tubular member into said receiving tubular member and to be compressed between said tapered wall portion and said external wall portion in response to relative longitudinal separating movement between said first tubular member and said receiving tubular member and, said inner circumferential surface portion defining circumferentially extending knife edge means for penetrating said external wall portion so as to prevent longitudinal movement of said first tubular member relative to said receiving tubular member;

an annular sealing member disposed in said annular cavity between said lock ring and said inner bore, said sealing member dimensioned to be engaged between said first tubular member and receiving tubular member; and said disengagement tool comprising;

a plurality of arcuately shaped parts each having an inner surface conforming to the outer surface of said first tubular member and adapted for engagement therewith in a juxtaposed relationship thereabout, said parts adapted for sliding movement on said first tubular member and having actuator end portions adapted to be pushed through said opening into said annular cavity and into forcible engagement with said lock ring so as to cause circumferential expansion thereof and thereby eliminate engagement between said knife edge and said first tubular member, at least one of said parts having a driver portion adapted to engage said first end of said lock ring and facilitate axial rotation thereof about said first tubular member in response to axial rotation of said one part about said outer surface of said first tubular member.

2. A tool according to claim 1 wherein said parts are first and second arcuately shaped parts attached by a flexible connector and having inner cylindrical surfaces, and said actuator end portions form a composite ring for engaging a circumferential surface portion of said lock ring.

3. A tool according to claim 1 wherein said actuator end portions form a composite annular surface having an inwardly projecting radius.

4. A tool according to claim 1 wherein each of said parts defines a radially outwardly extending shoulder portion.

5. A tool according to claim 4 wherein said actuator end portions form a composite annular surface having an inwardly projecting radius.

6. A tool according to claim 1 wherein said driver portion projects longitudinally from said actuator end portions.

7. A tool according to claim 6 wherein said driver portion is shaped and arranged for longitudinal movement into a gap between said axially displaced ends of said lock ring.

8. A tool according to claim 7 wherein said actuator end portions form a composite annular surface having an inwardly projecting radius.

9. A tool according to claim 8 wherein each of said parts defines a radially outwardly extending shoulder portion.

* * * * *